US008370478B2

(12) United States Patent
Lesartre et al.

(10) Patent No.: US 8,370,478 B2
(45) Date of Patent: Feb. 5, 2013

(54) TESTING A DATA COMMUNICATION ARCHITECTURE

(75) Inventors: Gregg Bernard Lesartre, Ft. Collins, CO (US); Craig William Warner, Addison, TX (US); Tyler Johnson, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3137 days.

(21) Appl. No.: 10/935,631

(22) Filed: Sep. 7, 2004

(65) Prior Publication Data

US 2006/0064480 A1 Mar. 23, 2006

(51) Int. Cl.
*G06F 15/173* (2006.01)

(52) U.S. Cl. ....................................................... 709/224

(58) Field of Classification Search .................. None
See application file for complete search history.

(56) References Cited

U.S. PATENT DOCUMENTS

| 6,560,720 | B1 * | 5/2003 | Chirashnya et al. ............ 714/32 |
| 6,665,266 | B1 * | 12/2003 | Brunheroto et al. .......... 370/232 |
| 7,185,232 | B1 * | 2/2007 | Leavy et al. ..................... 714/41 |
| 7,251,690 | B2 * | 7/2007 | Williams ..................... 709/224 |

* cited by examiner

*Primary Examiner* — Jerry Dennison

(57) ABSTRACT

A method, system, and apparatus for testing a scalable computer system is provided. In an illustrative implementation, a system for testing a scalable computer system includes configuring a single cell on a partitionable system to create an isolated test channel. A test packet is generated and provided to the test channel. The test channel inserts the test packet into the scalable computer system via a communications link, and a response to the insertion of the test packet is monitored to determine system performance.

12 Claims, 4 Drawing Sheets

TESTING A DATA COMMUNICATION ARCHITECTURE

BACKGROUND

Computing architectures that operate efficiently and that can process large volumes of data quickly are often preferred over their counterparts. Additionally, it is often desired to operate a variety of tasks, using a variety of computer resources, simultaneously within a computer system. Accordingly, developing complex multiprocessor systems has been the subject of significant of research.

A number of data communication architectures have been developed in order to facilitate communications between cooperating components within a computer system. Various types of equipment can be used as computer components, each requiring data communication. For example, a computer system may comprise a plurality of processors, data storage units, printers, monitors, etc. A number of data communication architectures currently exist to communicate data between computer components. For example, SCSI (Small Computer Systems Interface), IDE/ATA (Integrated Drive Electronics/Advanced Technology Attachment), USB (Universal Serial Bus) are common architectures used to communicate between processors, hard drives, CD-ROMs, serial data ports, etc.

These existing data communication architectures have been effective in creating a means to communicate between cooperating computer components; however, none of them are specifically designed to handle very high volumes of data at high clock frequencies (e.g., several Gigahertz). As a result of the need for higher bandwidth data communications, new communication architectures have been implemented to allow for high speed serial communications. One example is the SERDES (serializer/deserializer) data communication architecture. SERDES uses an encoder to encode data and then communicates it over one or more communication channels to a decoder for a corresponding decoding process. This architecture has proven to be an effective means to increase data communication bandwidth between cooperating computer components.

The development of high speed communication architectures has made it possible for system designers to create large, scalable computer systems. Systems such as the Superdome® system by Hewlett-Packard (Palo Alto, Calif.) have been created that contain numerous processors that can be configured or partitioned into several independent sections in order to allow for each component to undertake different tasks. The amount of applications, tasks, computations, etc. that can be performed by one computer system continues to grow as the size and complexity of larger, scalable computer systems such as the Superdome® system increases.

One obstacle in the development of complex scalable systems is the difficulty in verifying design parameters and conducting efficient testing of the system. The complexity of these systems as well as the complicated nature of the communication protocols used in them makes these systems difficult to thoroughly test.

SUMMARY

A method, system, and apparatus for testing a scalable computer system is provided. In an illustrative implementation, a system for testing a scalable computer system includes configuring a single cell on a partitionable system to create an isolated test channel. A test packet is generated and provided to the test channel. The test channel inserts the test packet into the scalable computer system via a communications link, and a response to the insertion of the test packet is monitored to determine system performance.

Further to the exemplary implementation, the illustrative embodiment may include generating test packets representative of hardware that is not present in the system and generating test packets representative of damaged hardware. Additionally, test packets can be inserted into the system with a targeted destination that does not allow packet receipt due to one or more firewalls, thus verifying firewall capabilities.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

DETAILED DESCRIPTION

Overview

Current scalable computer systems or networks may include numerous processing units using complicated protocols for communication. Often it is desired to enable the various elements of the system to communicate freely between each other, while other times it is preferred that some elements be completely isolated from other element to avoid potential interference as well to reduce possible security concerns. As a result, configuration of scalable computer systems is often a complicated task.

Once a system design has been constructed, it is preferred that the system can be thoroughly tested prior to deployment. This, however, can be a difficult task. Typically, in order to stress system designs, test programs are used to perform certain tasks and evaluate system performance. Some functions are extremely difficult, or impossible, to test in this manner. Design parameters involving very large system configurations, error detection.

procedures, and error recovery operations are among the more difficult system functions to verify. For example, it is difficult to test the system response to a damaged piece of hardware. Damaged hardware can send data into the system that is distinct from data that would occur during normal operations. One method to test such cases has been to create a custom piece of hardware representative of a damaged piece of equipment (e.g., a chip with a broken or missing pin) to simulate the possible system conditions. This solution, however, is generally not a practical means to test all possible conditions.

The present invention provides a mechanism to enable system designers to simulate various system conditions that may occur, both in normal operation and in the event of the failure of one or more particular devices. A system is provided to simulate conditions that may occur in a computer system via inserting data packets. Data packets representative of those occurring under various conditions are provided to the system and the response to such packet insertion is monitored. In this manner, system designers can verify various design parameters.

Illustrative Computing Environment

Figure 1:
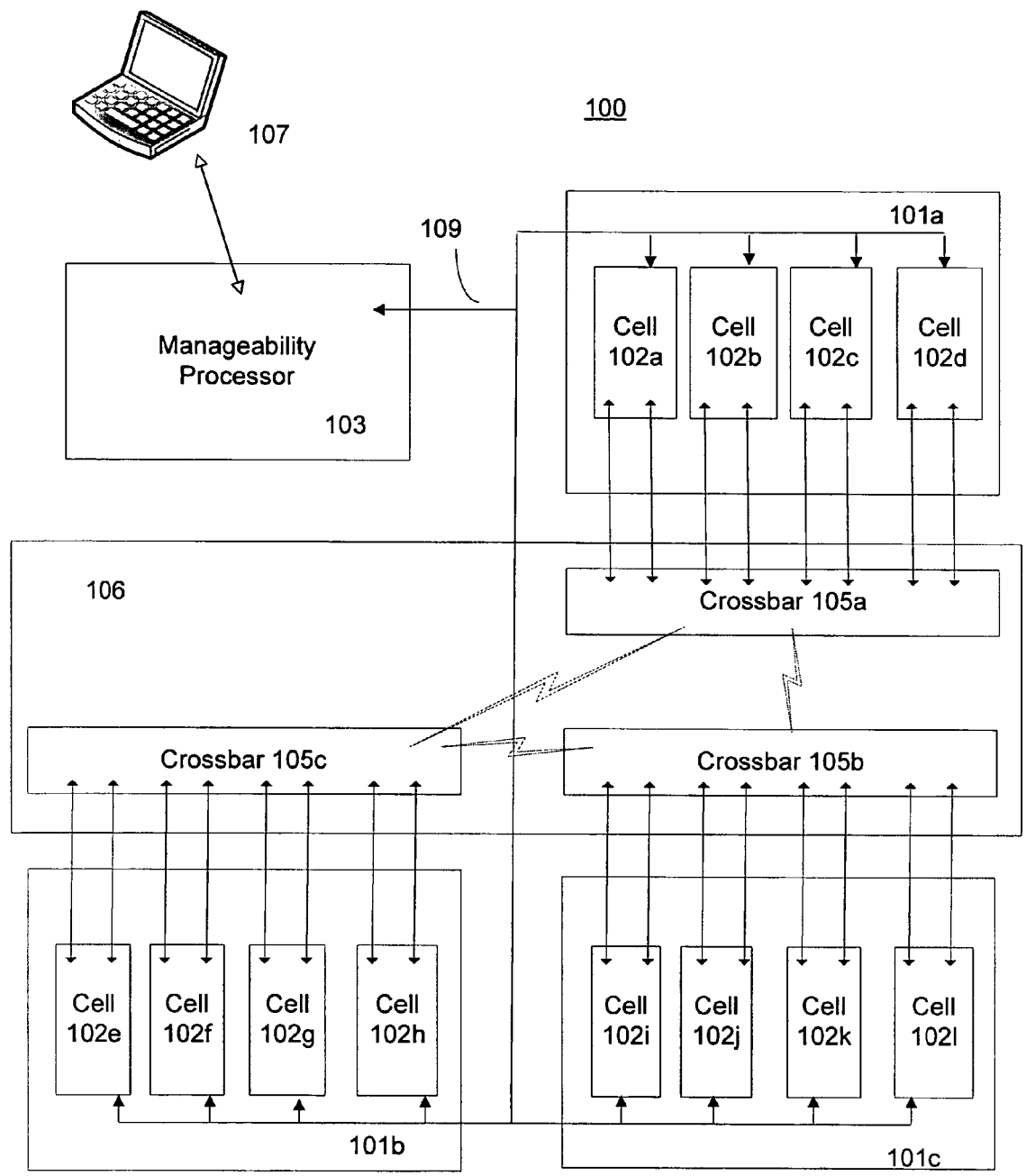
FIG. 1 is a block diagram illustrating an exemplary computer system upon which one implementation of the present invention can operate.

Referring to FIG. 1, an exemplary computing system 100 on which the system and method described herein can operate is shown. FIG. 1 illustrates a partitionable computer system that includes a plurality of elements or cells. One example of a system as illustrated in FIG. 1 is the Superdome® system by Hewlett-Packard (Palo Alto, Calif.). In the illustrated embodiment, three partitions 101a, 101b, 101c are shown. Each partition comprises a plurality of cells 102a-102l. Each cell has the ability of communicating with every other cell within the system, either by direct connection or via a routing device such as a crossbar switch or other similar device capable of routing packets. In the exemplary embodiment, the routing device comprises a plurality of crossbars 105a, 105b, 105c.

The series of routing devices (e.g., the crossbars 105a, 105b, 105c) is referred to collectively as a switch fabric 106. The switch fabric 106 allows packets to be communicated from an originating cell (i.e., the source address) to a destination cell (i.e., the destination address). For example, in the exemplary embodiment illustrated in FIG. 1, three crossbar devices 105a, 105b, 105c are shown, which collectively comprise switch fabric 106. The crossbar device can communicate with a number of cells, as well as with the other crossbar devices. For example, the four cells 102a, 102b, 102c, 102d located in partition 111a can communicate directly with the crossbar 105a that is directly coupled to them. The same scenario exists for the cells located in the remaining partitions. The cells are capable of communicating with the crossbar directly coupled to it. A cell in the first partition (e.g., partition 101a) can also communicate with a cell located in a different partitions (e.g., partition 10c) via the switch fabric 106. Data originating at a cell in one partition (e.g., cell 102a in partition 101a) can be sent to the crossbar device coupled to the partition (i.e., crossbar 105a) and then forwarded across the fabric 106 to a destination cell coupled to another crossbar device (e.g., cell 102h in partition 101c coupled to crossbar 105c).

The partitions are a logical separation from the remainder of the system. A partition may reside on a different physical device, or it may reside on the same physical device as one or more other partitions. A partition may be dedicated to performing a specific computer function. The functions may be related (e.g., multiple functions required by a single application) or they may be unrelated (e.g., two different operating systems running two separate applications). Additionally, at any given moment, cells may exist within the computer system 100 that are idle. In one embodiment, at least one idle or spare cell may be configured into a partition to be available in case of a failure occurring in one of the used cells, analogous to a spare tire carried in an automobile.

Data communication across the exemplary system shown in FIG. 1 is conducted using a "packet" format. A packet carries some amount of information, and may comprise one or more smaller packets. For example, a packet may comprise a header packet followed by some number of small data packets. The header packet is often used to describe the type of information contained within the packet or to provide information regarding how to handle the packet, such as the destination address of the packet. By way of example, the system described herein uses packets comprising eight logical bits that are transmitted in a ten bit encoding protocol, known as 8B10B encoding. However, it is understood that other transmission protocols could also be employed.

Packet Injection

Figure 2:
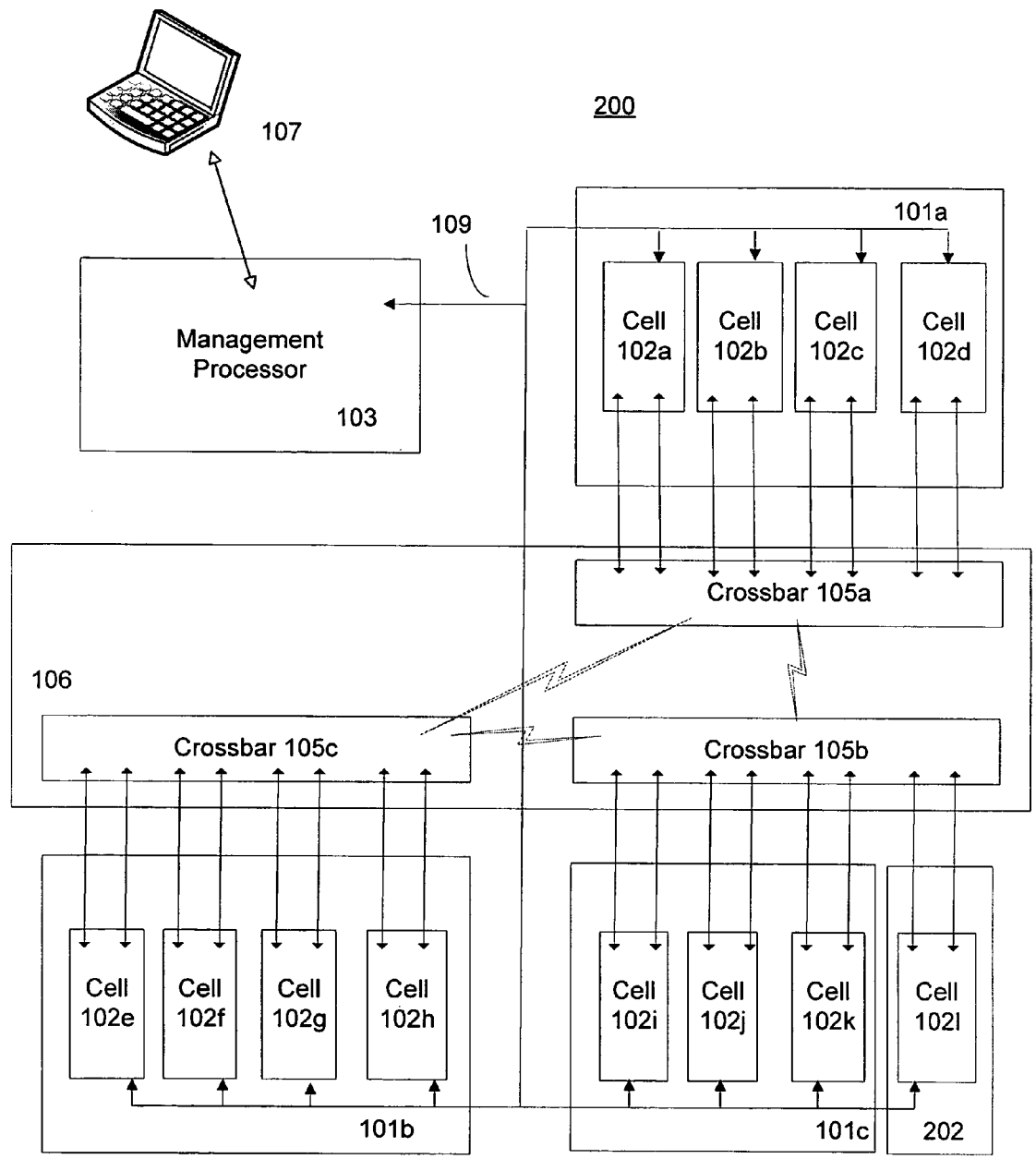
FIG. 2 is a diagram illustrating an exemplary configuration of a system as shown in FIG. 1 having a single cell partition upon which one implementation of the present invention can operate.

Referring to FIG. 2, the configuration of a computer system in accordance with one implementation of the present invention is shown. A single cell injection partition 202 is configured on the computer system 200. In an exemplary implementation, the configuration process is performed by a system designer by accessing the system via a management processor 103. The management processor can contain a graphical user interface 107 to allow the system designer to enter configuration information into the system. The management processor 103 sends the configuration information to the cells, typically via a USB connection to other cells. In an exemplary embodiment, executable code is sent to the processor 103. The code is run on the processor 103 to set up partition configuration and provide routing information. This process tells the cells how the partitions are to be created.

An unused or spare cell may be used to create the single cell injection partition 202. Often, systems have a capacity to handle more cells than are needed for a particular system design. This allows for a spare cell to be selected as the single cell injection partition 202. Because a spare cell is typically used, there is generally no concern surrounding a reduction upon the total capacity of the system by creating the injection partition.

Figure 3:
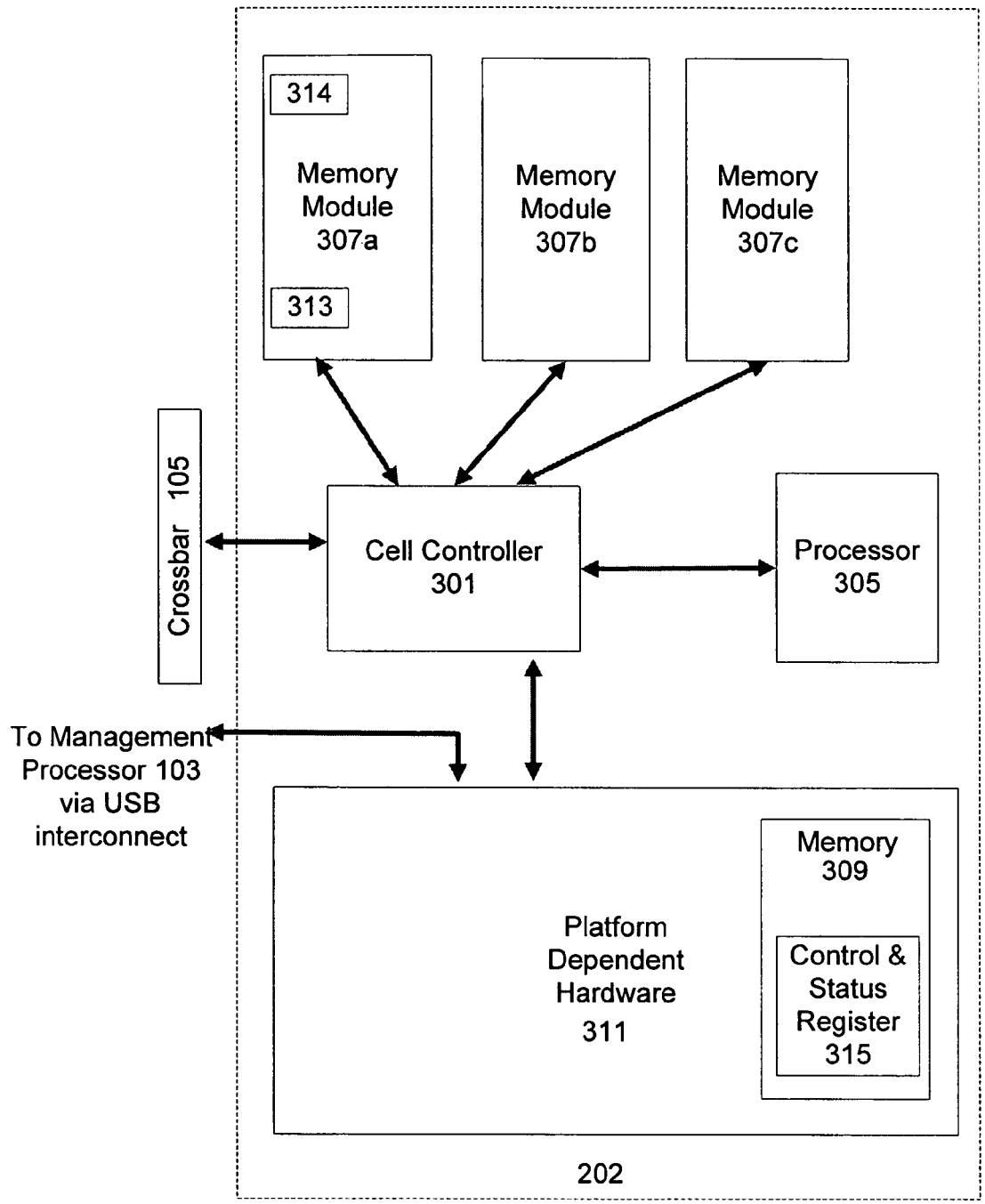
FIG. 3 is a diagram illustrating the components contained in an exemplary cell used for the single cell partition.

FIG. 3 illustrates the contents of the single cell injection partition 202. In an exemplary embodiment, cell 202 comprises a cell controller 301. The cell controller 301 is in communication with the system fabric via crossbar 105. Additionally, cell controller 301 is coupled within cell 202 to a processor 305 and one or more memory modules 307a, 307b, 307c. In the illustrated embodiment, a single processor 305 resides within the cell 202. It is, however, understood that the cell 202 may contain a plurality of processors and various numbers of memory modules. Additional platform dependent hardware 311 may also reside within the cell. In an exemplary embodiment, the platform dependent hardware 311 communicates with the management processor via a USB interconnect. The configuration information that creates the one cell partition is stored in a memory 309 located on the platform dependent hardware 311. In an exemplary embodiment, a control and status register 315 resides in the memory 309 on the platform dependent hardware 311 to store the configuration information.

The memory modules 307a, 307b, 307c enable the creation of various buffers and I/O modules in a cell. In the embodiment illustrated in FIG. 3, a first buffer 313 and an I/O module 314 reside in memory module 307a. It is understood, however, that various numbers of buffers, modules, etc. can be created in the available memory. The first buffer 313 may be used to store packets to be injected into the system fabric by the injector cell, as described below. Alternatively, the first buffer 313 on a victim cell may be used to store packets received from cell controller 301, such as configuration and initialization commands, error status commands, and/or processing commands. Such a configuration is merely exemplary, as other configurations (e.g., cell controller 301 supplying received packets directly to processor 305) would be apparent to one of skill in the art.

Figure 4:
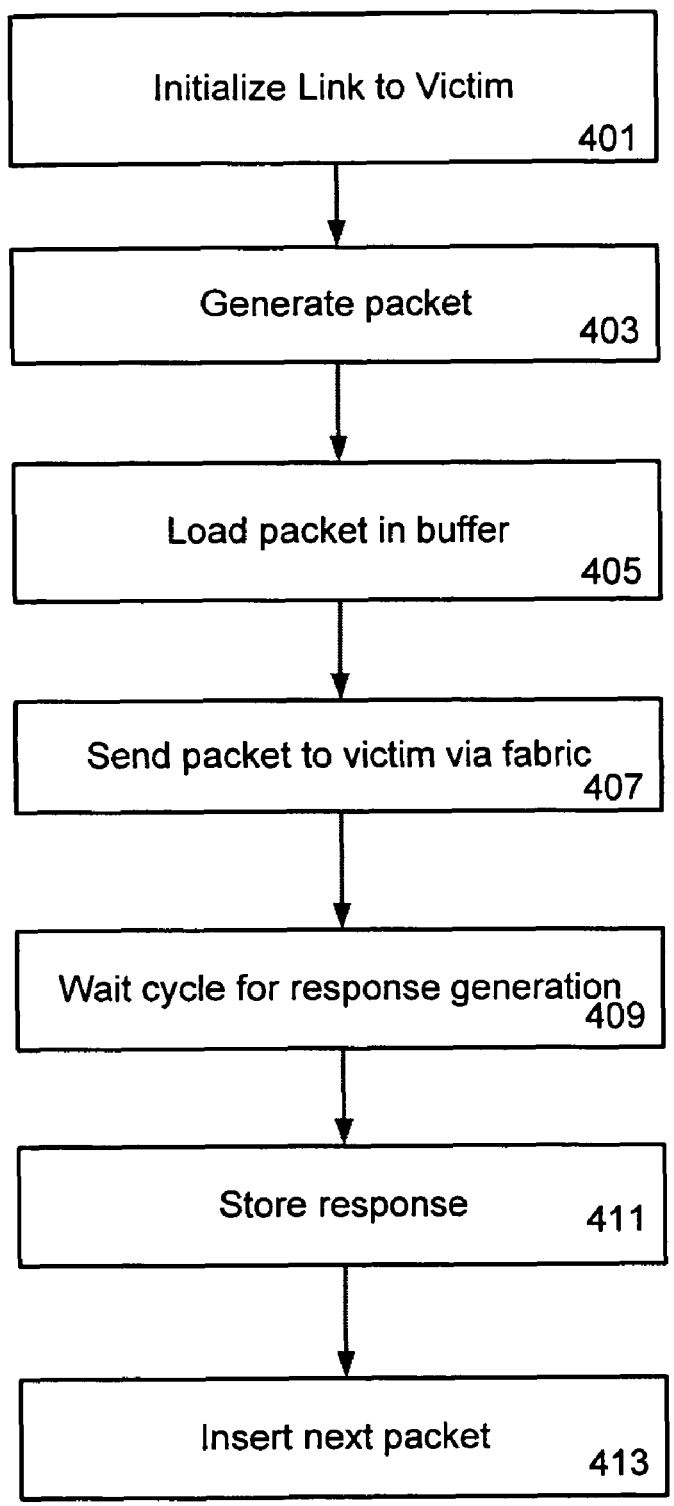
FIG. 4 is a flow chart illustrating the steps involved to insert a packet into the system fabric in accordance with an exemplary embodiment of the present invention.

The one cell injection partition 202 may be used to inject various packets into the system fabric. The steps involved in an exemplary packet injection process are illustrated in the flow chart shown in FIG. 4. For the purposes of this discussion, the origination location (e.g., the processor within the one cell partition) is referred to as the "injector" and the destination location element (e.g. a chip located at another location in the system) is referred to as the "victim." The term victim may be used to describe an end destination for a packet, such as a cell in the system separate from the one cell injection partition 202, or the term victim may also refer to the an intermediate location within the system fabric (e.g., a port on a crossbar switch that is in communication with the injector).

A test packet is generated (401). The test packet can be generated using software running on the processor residing within the one cell injection partition, or alternatively software for generating the test packet can operate remotely and the packet can be communicated to the injector. Additionally, the test packet can be manually created by the test administrator.

A link between the injector and the victim is initialized (403). This enables the victim to be configured to receive packets via the system fabric by writing data to the control and status registers located in memory on the victim. In an exemplary embodiment, this is accomplished by using a buffer existing on the victim to capture packets received by victim.

The generated test packet is written into the injection buffer contained on the injector (405). The controller in the one-cell injector partition sends the packet to the victim via the system fabric (407). After injecting the packet into the system fabric, the one-cell injector partition waits a pre-determined time for a response to be generated (409). In an exemplary embodiment, a two second delay is generally sufficient for a packet to reach its destination via the system fabric and for any response to be generated. The generated response may be returned to the injector via the system fabric. Typically, the response is stored in a buffer in the victim where it can be accessed via control and status register commands (411). The process may then be repeated for any additional test packets that the system designer wishes to inject (413).

The recorded response record can be compiled in to a report and output via the GUI interface if desired. Alternatively, a message may be generated to the GUI interface only if an unexpected result is received. For example, packets requesting a response may be directed to a location in the system that is protected by a firewall. No response is expected, as the packet should be discarded by the firewall, but a message would be provided to the GUI interface if a response is received.

Using this technique, various types of packets can injected into the system. Normal operating packets can be injected to simulate various operating conditions. Injecting normal operating packets allows for system designers to verify system performance under various conditions. For example, the routing between any two points can be tested by injecting a packet that appears to the victim cell to have originated at a point in the system other than the injector cell. Abnormal packets can also be injected. Abnormal packets can be used to simulate conditions, for example, that otherwise occur if a hardware component has failed. For example, a bad or damaged hardware component (e.g., a chip with a broken pin) may cause packets to be sent that are of an abnormal nature (e.g., containing undefined or missing bits). Packets of this nature were previously not able to be inserted into the system fabric by means of intentionally damaged hardware elements. Using a one-cell injector partition allows for such abnormal packets to be inserted into the system fabric without the need for custom hardware, and the response to such packets can be monitored.

The system described herein can also be used to verify the effectiveness of firewall partitions. Packets can be created both of the type that should be allowed to pass through the firewall as well as of the type that should be rejected by the firewall. Injecting these packets into the system fabric will allow the system designer to determine if the firewall is blocking the desired packets.

A variety of modifications to the embodiments described will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A method of testing a data communication architecture comprising:
    configuring a single cell test partition from a plurality of cell partitions;
        providing by a management process executing outside the data communication architecture a test packet of at least one bit to said single cell test partition;
        sending by said single cell test partition said test packet into said architecture via a direct communications link to at least one other cell partition;
        retrieving by the management process a response to said sending step.

2. The method as set forth in claim 1, wherein configuring a single cell test partition comprises establishing said single cell partition from an unused block.

3. The method as set forth in claim 2, wherein sending said packet into said architecture further comprises initializing a direct link between said partition and a destination location for said packet.

4. The method as set forth in claim 1 wherein said packet is representative of a hardware component.

5. The method as set forth in claim 4, wherein said packet is representative of a malfunctioning hardware component.

6. The method as set forth in claim 4, wherein said hardware component does not exist within the architecture.

7. The method as set forth in claim 1, wherein said packet is software generated.

8. The method as set forth in claim 1, wherein the monitoring step includes generation of an error report.

9. A system for testing a data communication architecture comprising:
    a management computer;
    a scalable computer network communicatively connected to the management computer; and
    a single cell partition within said network configured to send a test packet via a direct communications link to at least one other cell of said network, the single cell partition configured to receive the test packet from the management computer.

10. A system as set forth in claim 9, further comprising a buffer to store said test packet.

11. A system as set forth in claim 9, wherein said packet is representative of bad hardware.

12. The method of claim 1, wherein retrieving further comprises: retrieving by the management process a response to said sending step from the at least one other cell partition.

* * * * *